United States Patent [19]

Asada et al.

[11] Patent Number: 4,573,807
[45] Date of Patent: Mar. 4, 1986

[54] FLUID BEARING DEVICE

[75] Inventors: Takafumi Asada, Hirakata; Churyo Yoshida, Amagasaki; Minoru Koda, Yawata; Hideaki Ohno, Sennan, all of Japan

[73] Assignee: Matsushita Electric Industrial Co., Ltd., Kodoma, Japan

[21] Appl. No.: 696,244

[22] Filed: Jan. 29, 1985

[30] Foreign Application Priority Data

Jan. 31, 1984 [JP] Japan .................................. 59-16551

[51] Int. Cl.⁴ ............................................. F16C 32/06
[52] U.S. Cl. ..................................... 384/100; 384/107
[58] Field of Search ...................... 384/100, 107-113, 384/322, 372, 286, 291, 292; 184/6.18; 310/90

[56] References Cited

U.S. PATENT DOCUMENTS 3,439,962  4/1969  Gothberg ............................ 384/107

FOREIGN PATENT DOCUMENTS

| 18812 | 1/1982 | Japan | 384/107 |
| 5518 | 1/1983 | Japan | 384/107 |
| 1222275 | 2/1971 | United Kingdom | 384/112 |

Primary Examiner—Stuart S. Levy
Assistant Examiner—Thomas R. Hannon
Attorney, Agent, or Firm—Wenderoth, Lind & Ponack

[57] ABSTRACT

A fluid bearing device including a shaft, a sleeve rotatably supported by the shaft, a thrust bearing plate supported by the sleeve, a radial groove formed on one of an outer periphery of the shaft and an inner periphery of the sleeve, and a spiral groove formed on one of one end face of the shaft and one face of the thrust bearing plate such that the radial groove retains oil, while the spiral groove retains grease containing thickener and base oil identical, in compositions and viscosity, with the oil of the radial groove.

12 Claims, 10 Drawing Figures

FLUID BEARING DEVICE

BACKGROUND OF THE INVENTION

The present invention generally relates to bearings and more particularly, to a fluid bearing device employing lubricant, which is constituted by a thrust bearing member and a radial bearing member provided independently of each other.

One example of prior art fluid bearing devices, which is applied to a rotating head apparatus (hereinbelow, referred to as a "VTR cylinder") of a video tape recorder, is shown in FIGS. 1 to 3. In FIGS. 1 to 3, a fixed shaft 1 is press fitted into a central bore of a lower cylinder 2. A disk 3 is rotatably fitted around the fixed shaft 2. A thrust bearing plate 4 is mounted on an upper face of the disk 3, while an upper cylinder 5 is secured to a shoulder portion of the disk 3. Furthermore, a magnetic head 6 is fixed to a lower face of the upper cylinder 5. A rotary member 7 of a rotary transformer is secured to a lower portion of the disk 3 so as to transmit, through the rotating magnetic head 6, to a fixed member 8 of the rotary transformer video signals delivered from a magnetic tape. The fixed member 8 of the rotary transformer, which receives the video signals of the magnetic tape, is fixed to the lower cylinder 2 so as to confront the rotary member 7 of the rotary transformer. Thus, a rotary unit 10 is constituted by the disk 3, thrust bearing plate 4, upper cylinder 5, magnetic head 6 and rotary member 7.

Meanwhile, a C-shaped retaining ring 9 shown in FIG. 3 is fitted around an upper portion of the fixed shaft 1 so as to prevent the rotary unit 10 from being removed from the fixed shaft 1. Furthermore, an armature magnet 11 of a direct drive type motor 13 is secured to a lower portion of the disk 3. A fixed coil unit 12 is mounted on the lower cylinder 2 so as to confront the armature magnet 11 such that the direct drive type motor 13 is secured to a lower portion of the disk 3. A fixed coil unit 12 is mounted on the lower cylinder 2 so as to confront the armature magnet 11 such that the direct drive type motor 13 is constituted by the armature magnet 11 and the fixed coil unit 12. The fixed coil unit 12 is at all times attracted at a force of 600 to 900 grams by the armature magnet 11.

Moreover, radial grooves 14A and 14B are, respectively, formed at the upper portion and a central portion of the fixed shaft 1 by etching, etc. An end face 1A of the fixed shaft 1 is subjected to precision machining in flatness and perpendicularity to an axis of the fixed shaft 1. A single-row spiral groove 15 shown in FIG. 2 is formed on a central lower face of the thrust bearing plate 4 by etching, etc. so as to confront the end face 1A. Either an identical oil or an identical grease is supplied, as lubricant of the known fluid bearing device, into the radial grooves 14A and 14B and the spiral groove 15. Accordingly, when the rotary unit 10 is rotated by the motor 13, a pressure is generated by a pumping effect of the grooves 14A, 14B and 15, so that rigidity of the oil film increases and thus, the rotary unit 10 rotates relative to the fixed shaft 1 with a bearing clearance of the oil film being positively defined therebetween. It is to be noted that the known fluid bearing device is constituted by a radial bearing member 16 and a thrust bearing member 17. The radial bearing member 16 of the known fluid bearing device is constituted by the fixed shaft 1, the radial grooves 14A and 14B and the disk 3, while the thrust bearing member 17 of the known fluid bearing device is constituted by the thrust bearing plate 4, the end face 1A and the spiral groove 15.

However, in the case where an identical oil or an identical grease is supplied into the radial grooves 14A and 14B and the spiral groove 15 as described above, the prior art fluid bearing device has the following three drawbacks.

Firstly, in the case where oil is used as the lubricant, a frictional bearing torque of the known fluid bearing device is required to be lowered to a small value in order to decrease power consumption of the motor 13 acting as a driving source. A load capacity Pr of the radial bearing member 16 and a frictional bearing torque Mr of the known fluid bearing device are, respectively, given by the following equations (1) and (2):

$$Pr \propto R^2 \cdot B^2 \qquad (1)$$

$$Mr \propto R^3 \cdot B \qquad (2)$$

where:
R = radius of fixed shaft 1, and
B = length of known fluid bearing device.

It will be readily understood from the above equations (1) and (2) that when a value of (R/B) is decreased, the frictional bearing torque Mr can be decreased while fixing the load capacity Pr at a constant value. Meanwhile, in order to lower a production cost of the known fluid bearing device through reduction of the number of its components, it has been usually so arranged as described above that the thrust bearing member 17 is constituted by the thrust bearing plate 4 and the end face 1A. Thus, when the radius R of the fixed shaft 1 is decreased, an area of the end face 1A of the fixed shaft 1 becomes excessively small. Furthermore, since oils usually have viscosities lower than those of greases and become further less viscous at high temperatures, a sufficient bearing clearance of the oil film is not defined at the thrust bearing member 17 and thus, the thrust bearing plate 4 and the end face 1A are subjected to wear through contact therebetween.

Secondly, in the case where grease is used as the lubricant, the grease has such inferior temperature characteristics compared with a low-viscosity oil that the grease has an extremely high viscosity at low temperatures as shown in FIG. 4. Meanwhile, the radial bearing member 16 is usually subjected to not less than 80% of the frictional bearing torque Mr. Thus, in the case where the grease is used for the radial bearing member 16, the frictional bearing torque Mr increases at low temperatures, so that a torque generated by the motor 13 becomes insufficient and thus, it becomes impossible to rotate the motor 13 at a predetermined number of revolutions.

Thirdly, in view of the disadvantages of the above first and second cases, oil is used for the radial bearing member 16, while grease is used only for the thrust bearing member 17. However, in this case, when the known fluid bearing device is operated at high temperatures of about 80° C. or more for a long time, a portion of base oil in the grease oozes out of the grease so as to be mixed with the oil of the radial bearing member 16 such that viscosity of the oil of the radial bearing member 16 changes or lubricating property of the oil changes extremely due to deterioration of effects of the additives, thereby impairing reliability of the known fluid bearing device.

SUMMARY OF THE INVENTION

Accordingly, an essential object of the present invention is to provide an improved fluid bearing device which has a small frictional bearing torque and is highly reliable in actual use, with substantial elimination of the disadvantages inherent in conventional fluid bearing devices of this kind.

In accomplishing these and other objects according to one preferred embodiment of the present invention, there is provided an improved fluid bearing device comprising: a shaft; a sleeve which is rotatably supported by said shaft; a thrust bearing plate which is supported by said sleeve such that one face of said thrust bearing plate is brought into contact with one end face of said shaft; a radial groove for producing a dynamic pressure, which is formed on one of an outer periphery of said shaft and an inner periphery of said sleeve; and a spiral groove which is formed on one of said end face of said shaft and said face of said thrust bearing plate; said radial groove retaining therein oil, while said spiral groove retains therein grease containing base oil and thickener, with said base oil being identical, in compositions and viscosity, with said oil retained in said radial groove.

In accordance with the present invention, it becomes possible to obtain a highly reliable fluid bearing device having excellent temperature characteristics.

BRIEF DESCRIPTION OF THE DRAWINGS

These and other objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
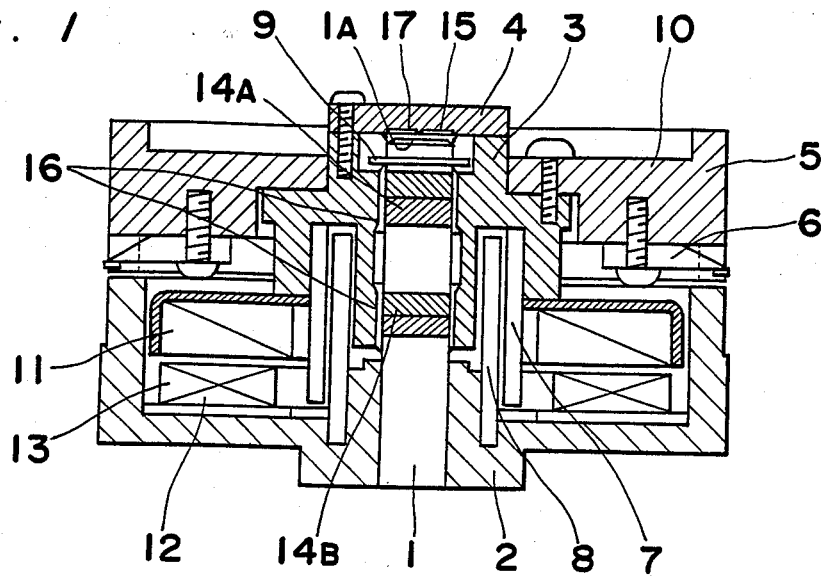
FIG. 1 is a cross-sectional view of a prior art fluid bearing device (already referred to)
Figure 2:
FIG. 2 is a top plan view of a spiral groove formed in the prior art fluid bearing device of FIG. 1 (already referred to)
Figure 3:
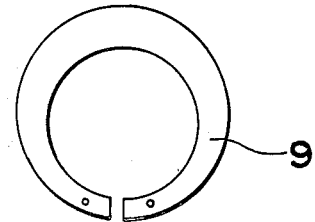
FIG. 3 is a top plan view of a retaining ring employed in the prior art fluid bearing device of FIG. 1 (already referred to)
Figure 4:
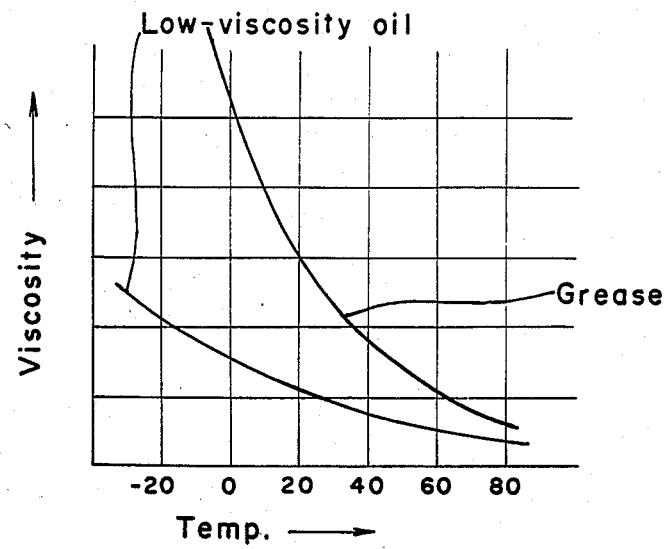
FIG. 4 is a graph of characteristic curves showing relation between viscosity and temperature of oil and grease in the prior art fluid bearing device of FIG. 1 (already referred to)
Figure 5:
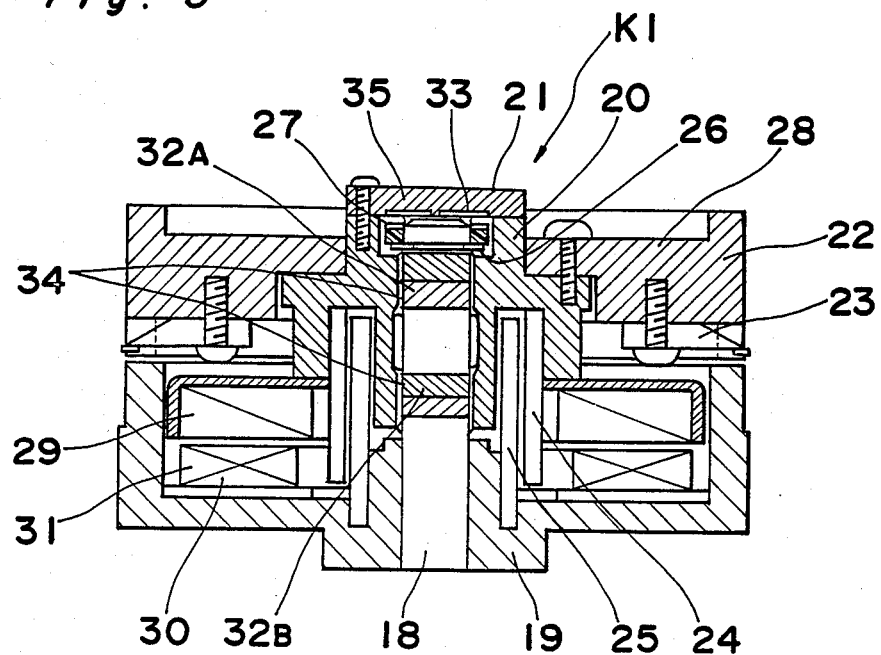
FIG. 5 is a cross-sectional view of a fluid bearing device according to a first embodiment of the present invention.
Figure 6:
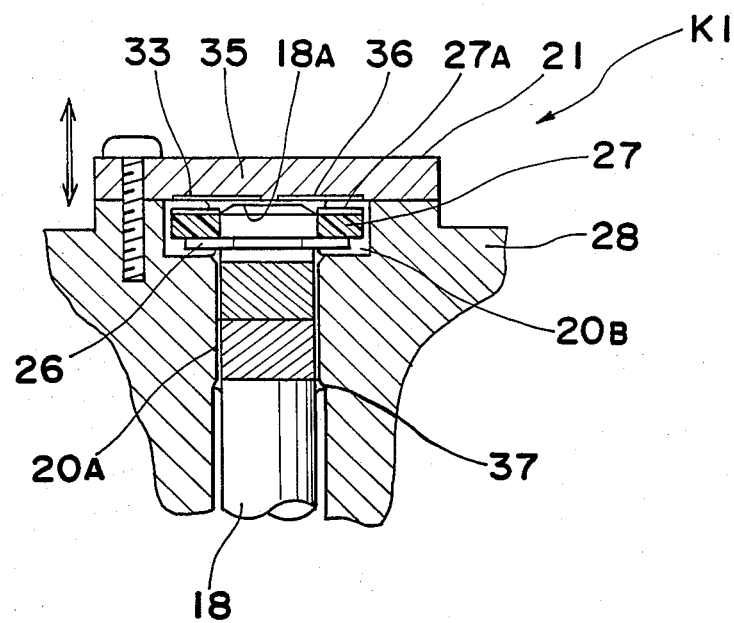
FIG. 6 is an enlarged cross-sectional view of a main portion of the fluid bearing device of FIG. 5.

Referring now to the drawings, there is shown in FIGS. 5 and 6, a fluid bearing device K1 according to a first embodiment of the present invention, which is applied to a VTR cylinder of a video tape recorder. In FIGS. 5 and 6, a fixed shaft 18 having an end face 18A is press fitted into a central bore of a lower cylinder 19. A disk 20 having a sleeve portion 20A is rotatably fitted around the fixed shaft 18. The disk 20 further has an opening 20B formed at an upper portion thereof. A thrust bearing plate 21 is mounted on an upper face of the disk 20, while an upper cylinder 22 is secured to a shoulder portion of the disk 20. Furthermore, a magnetic head 23 is secured to a lower face of the upper cylinder 22. A rotary member 24 of a rotary transformer is secured to a lower portion of the disk 20 so as to transmit, though the rotating magnetic head 23, to a fixed member 25 of the rotary transformer video signals delivered from a magnetic tape. The fixed member 25, which receives the video signals of the magnetic tape, is fixed to the lower cylinder 19 so as to confront the rotary member 24 of the rotary transformer.

Meanwhile, an armature magnet 29 of a direct drive type motor 31 is secured to a lower portion of the disk 20. A fixed coil unit 30 is mounted on the lower cylinder 19 so as to confront the armature magnet 29 such that the direct drive type motor 31 is constituted by the armature magnet 29 and the fixed coil unit 30. The fixed coil unit 30 is at all times attracted at a force of 600 to 900 grams by the armature magnet 29. Thus, a rotary unit 28 is constituted by the disk 20, thrust bearing unit 21, upper cylinder 22, magnetic head 23, rotary member 24 and armature magnet 29. A C-shaped retaining ring 26 is fitted around an upper portion of the fixed shaft 18 so as to prevent the rotary unit 28 from being removed from the fixed shaft 18.

Furthermore, radial grooves 32A and 32B are, respectively, formed at the upper portion and a central portion of the fixed shaft 18 by etching, etc. The end face 18A of the fixed shaft 18 is subjected to precision machining in flatness and perpendicularity to an axis of the fixed shaft 18. A single-row spiral groove 33 is formed on a central lower face of the thrust bearing plate 21 by etching, etc. so as to confront the end face 18A.

It should be noted that the fluid bearing device K1 is constituted by a radial bearing member 34 and a thrust bearing member 35. The radial bearing member 34 is constituted by the fixed shaft 18, disk 20 and radial grooves 32A and 32B, while the thrust bearing member 35 is constituted by the end face 18A, thrust bearing plate 21 and spiral groove 33. It should be further noted that grease 36 and oil 37 are supplied, as lubricant of the fluid bearing device K1, independently of each other into the thrust bearing member 35 and the radial bearing member 34, respectively.

Hereinbelow, the lubricant of the fluid bearing device will be described. The oil 37 of the radial bearing member 34 is obtained by adding a small amount of additive to one of such oils having excellent temperature characteristics as diester, polyol ester, alpha-olefin, mineral oil, etc. Meanwhile, the grease 36 of the thrust bearing member 35 is obtained by adding one of such thickeners as stearic acid, oleic acid, lithium stearate, etc. to base oil. The oil 37 containing the additive is as it is employed as the base oil of the grease 36 such that the base oil of the grease 36 is identical, in at least viscosity and compositions, with the oil 37. It is to be noted here that the present invention is characterized in that the oil 37 is identical with the base oil of the grease 36.

In this embodiment of the present invention, dimer, trimer or tetramer of decene-1 which is a kind of alpha-olefin was employed as the oil 37 of the radial bearing member 34. Meanwhile, the grease 36 of the thrust bearing member 35 was obtained by adding lithium stearate (thickener) to the oil 37 prepared as described above.

In the case where a fluid bearing device of this kind is applied to the VTR cylinder or the like, the fluid bearing device should be operated at temperatures ranging widely from about −10° C. to about 80° C. or more. Thus, the fluid bearing device is required to have such contrary characteristics as a small frictional bearing torque at low temperatures and high reliability at high temperatures. In the fluid bearing device K1, since the oil 37 having excellent temperature characteristics is used for the radial bearing member 34 subjected to a majority of a frictional bearing torque of the fluid bearing device K1, the radial bearing member 34 functions excellently. Meanwhile, the grease 36, which has a viscosity far higher than that of the oil 37 even at high temperatures, is used for the thrust bearing member 35 having a small bearing area, it becomes, needless to say, possible to positively ensure lubricating property and reliability of the thrust bearing member 35. Furthermore, in the fluid bearing device K1, the oil 37 of the radial bearing member 34 is identical with the base oil of the grease 36 of the thrust bearing member 35. Accordingly, even if the fluid bearing device K1 is operated at high temperatures for a long time and thus, a small amount of the base oil in the grease 36 oozes out of the grease 36 so as to be mixed with the oil 37 of the radial bearing member 34, such undesirable phenomena as change of viscosity of the oil 37, deterioration of lubricating property of the oil 37, etc. do not take place, whereby it becomes possible to ensure proper performances and reliability of the fluid bearing device K1.

The fluid bearing device K1 further includes a ring 27 fitted around the fixed shaft 18 and adjacent to the end face 18A such that the ring 27 is disposed between the retaining ring 26 and the thrust bearing plate 21. A fluid bearing device of this kind is required to be resistant against vibrations during its transport for a long time, drop impact forces during its use, etc. When the fluid bearing device is subjected to such heavy vibrations or large drop impact forces, the rotary unit 28 is vibrated vertically as shown by the arrow in FIG. 6 and thus, a portion of the grease 36 of the thrust bearing member 35 is scattered therearound, thereby resulting in possible lack of the grease 36 in the thrust bearing member 35. However, the fluid bearing device K1 is provided with the ring 27 such that a clearance between the thrust bearing plate 21 and the ring 27 is set at 0.1 to 0.5 mm. Thus, when the rotary unit 28 is rotated, most of the scattered portion of the grease 36 scattered by pumping effect of the spiral groove 33 of the thrust bearing plate 21 can be again returned to a bearing clearance of the thrust bearing member 35, so that such a phenomenon as lack of the grease 36 in the thrust bearing member 35 does not take place. Moreover, the ring 27 prevents the grease 36 from being mixed with the oil 37 of the radial bearing member 34 with the result that the frictional bearing torque of the fluid bearing device K1 increases.

As shown in FIG. 6, since the ring 27 has a transport groove 27A formed on one face thereof adjacent to the thrust bearing plate 21 and the spiral groove 33 is formed so large as to be approximately identical, in size, with the ring 27, the scattered grease can be rapidly collected into the bearing clearance of the thrust bearing member 35.

Figure 7:
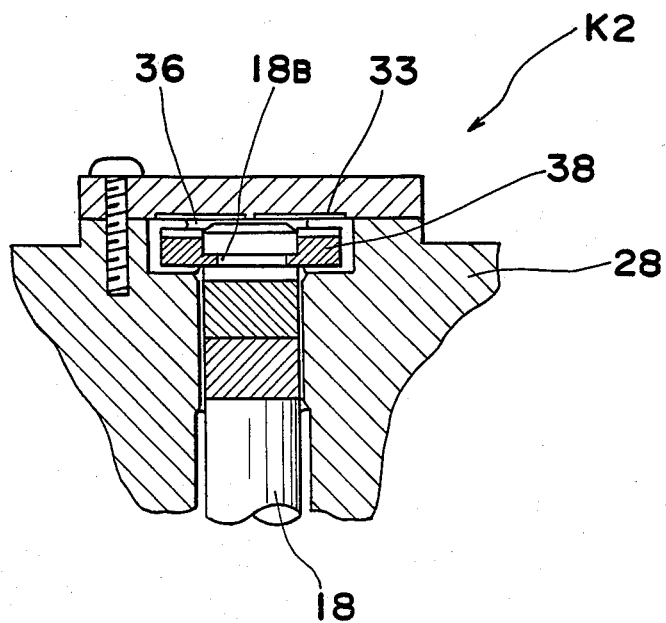
FIG. 7 is a view similar to FIG. 5, particularly showing a fluid bearing device according to a second embodiment of the present invention.
Figure 8:
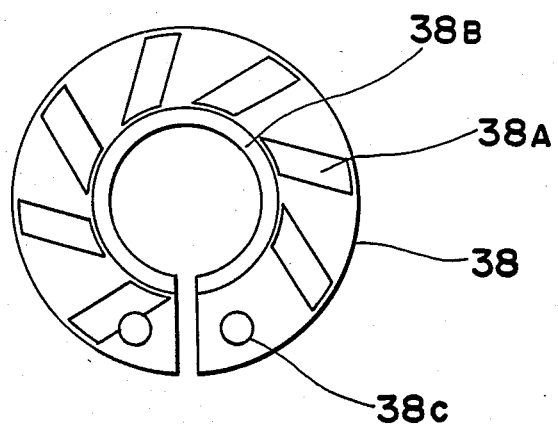
FIG. 8 is a top plan view showing, on an enlarged scale, a ring employed in the fluid bearing device of FIG. 7.

Referring to FIGS. 7 and 8, there is shown a fluid bearing device K2 according to a second embodiment of the present invention. The fluid bearing device K2 includes a C-shaped ring 38 in place of the retaining ring 26 and the ring 27 of the fluid bearing device K1. The ring 38 is formed with a split extending in a radial direction thereof. The ring 38 is further formed with a plurality of transport grooves 38A for collecting grease scattered upon drive of the rotary unit 28, a retainer portion 38B engageable with a circumferential groove 18B of the fixed shaft 18, and a pair of holes 38C provided at both sides of the slit and adjacent to the slit, respectively. The retainer portion 38B is brought into engagement with the circumferential groove 18B of the fixed shaft 18 so as to prevent the rotary unit 28 from being removed from the fixed shaft 18. The holes 38C are used for assembly and disassembly of the fluid bearing device K2. The spiral groove 33 is formed so large as to collect grease thereinto.

Figure 9:
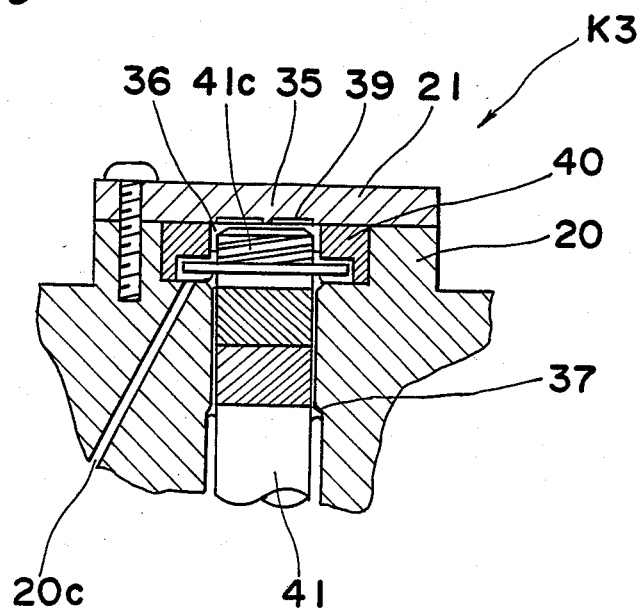
FIG. 9 is a view similar to FIG. 7, particularly showing a fluid bearing device according to a third embodiment of the present invention.

Referring to FIG. 9, there is shown a fluid bearing device K3 according to a third embodiment of the present invention. The fluid bearing device K3 includes a ring 40 and a fixed shaft 41. Furthermore, the thrust bearing plate 21 is formed with a spiral groove 39. The ring 40 is held in contact with the thrust bearing plate 21 between the disk 20 and the fixed shaft 41 so as to be rotated together with the disk 20. Thus, even if the fluid bearing device K3 is subjected to vibrations, etc., it becomes possible to substantially prevent the grease 36 from scattering out of the thrust bearing member 35 and the spiral groove 39 collects the grease 36 to a central portion of the thrust bearing member 35. Moreover, since a helical groove 41C is formed on either an outer periphery of an upper portion of the fixed shaft 41 or an inner periphery of the ring 40, the scattered grease can be more positively collected into the thrust bearing member 35. Meanwhile, a vent hole 20C is formed on the disk 20 so as to prevent the oil 37 from being forced out of the radial bearing member 34.

It is to be noted here that in the case where the ring 27, rotary unit 28 and ring 40 are made of elastic synthetic resin such as polyether sulphone (PES), polybutylene terephthalate (PBT), etc., the fluid bearing device of the present invention becomes excellent in oil resistance and creep resistance.

Figure 10:
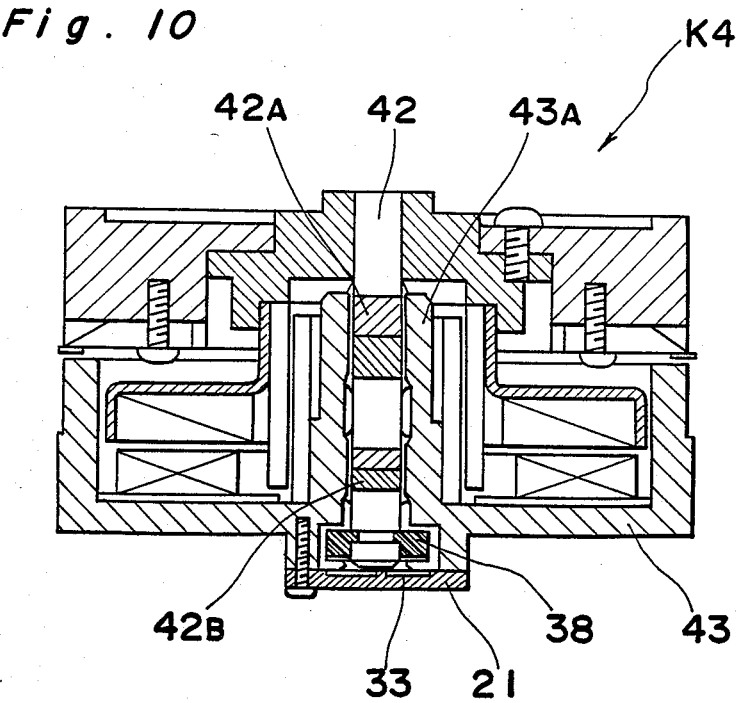
FIG. 10 is a view similar to FIG. 5, particularly showing a fluid bearing device according to a fourth embodiment of the present invention.

Referring further to FIG. 10, there is shown a fluid bearing device K4 according to a fourth embodiment of the present invention. The fluid bearing device K4 includes a shaft 42, a lower cylinder 43 having a sleeve portion 43A and the ring 38 of the fluid bearing device K2. The shaft 42 is formed with radial grooves 42A and 42B. In the fluid bearing device K4, it is so arranged that the shaft 42 is rotated.

Since other constructions of the fluid bearing devices K2, K3 and K4 are similar to those of the fluid bearing device K1, detailed description thereof is abbreviated for the sake of brevity. Furthermore, although the end face 18A of the fixed shaft 18 is formed flat in the above embodiments of the present invention, it can be also so arranged that the end face 18A is formed into a shape of a sphere or trapezoid.

As is clear from the foregoing description, in accordance with the present invention, since oil is used for the radial bearing member while grease containing the oil of the radial bearing member as its base oil is used for the thrust bearing member, it becomes possible to obtain a highly reliable fluid bearing device functioning excellently at high temperatures. Furthermore, in accordance with the present invention, the fluid bearing device produces such remarkably practical effects as resistance against vibrations and drop impact forces.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A fluid bearing device comprising:
    a shaft;
    a sleeve which is rotatably supported by said shaft;
    a thrust bearing plate which is supported by said sleeve such that one face of said thrust bearing plate is brought into contact with one end face of said shaft;
    a radial groove for producing a dynamic pressure, which is formed on at least one of an outer periphery of said shaft and an inner periphery of said sleeve; and
    a spiral groove which is formed on at least one of said end face of said shaft and said face of said thrust bearing plate;
    said radial groove retaining therein oil, while said spiral groove retains therein grease containing base oil and thickener, with said base oil being identical, in compositions and viscosity, with said oil retained in said radial groove.

2. A fluid bearing device as claimed in claim 1, wherein said oil consists essentially of one of diester, polyol ester, alpha-olefin and mineral oil.

3. A fluid bearing device comprising:
    a shaft;
    a sleeve which is rotatably supported by said shaft;
    a thrust bearing plate which is supported by said sleeve such that one face of said thrust bearing plate is brought into contact with one end face of said shaft;
    a radial groove for producing a dynamic pressure, which is formed on at least one of an outer periphery of said shaft and an inner periphery of said sleeve;
    a spiral groove which is formed on at least one of said end face of said shaft and said face of said thrust bearing plate; and
    a ring which is mounted, in the vicinity of said end face of said shaft, on said shaft;
    said radial groove retaining therein oil, while said spiral groove retains therein grease containing base oil and thickener, with said base oil being identical, in compositions and viscosity, with said oil retained in said radial groove.

4. A fluid bearing device as claimed in claim 3, wherein said ring has a first face confronting said face of said thrust bearing plate such that a distance between said first face and said face is set at 0.1 to 0.5 mm.

5. A fluid bearing device as claimed in claim 3, wherein said ring has a first face confronting said face of said thrust bearing plate and said first face is formed with a groove for transporting said grease.

6. A fluid bearing device as claimed in claim 3, wherein said shaft is formed with a circumferential groove and said ring includes a retainer portion formed at an inner periphery thereof such that said retainer portion is brought into engagement with said circumferential groove.

7. A fluid bearing device as claimed in claim 3, wherein said ring is made of synthetic resin.

8. A fluid bearing device as claimed in claim 3, wherein said oil consists essentially of one of diester, polyol ester, alpha-olefin and mineral oil.

9. A fluid bearing device comprising:
    a shaft;
    a sleeve which is rotatably supported by said shaft;
    a thrust bearing plate which is supported by said sleeve such that one face of said thrust bearing plate is brought into contact with one end face of said shaft;
    a radial groove for producing a dynamic pressure, which is formed on at least one of an outer periphery of said shaft and an inner periphery of said sleeve;
    a spiral groove which is formed on at least one of said end face of said shaft and said face of said thrust bearing plate; and
    a ring which is mounted, in the vicinity of said end face of said shaft, on said sleeve so as to be coaxial with said shaft;
    said radial groove retaining therein oil, while said spiral groove retains therein grease containing base oil and thickener, with said base oil being identical, in compositions and viscosity, with said oil retained in said radial groove.

10. A fluid bearing device as claimed in claim 9, wherein a helical groove is formed, in the vicinity of said end face of said shaft, on one of an outer periphery of said shaft and an inner periphery of said ring.

11. A fluid bearing device as claimed in claim 9, wherein said ring is made of synthetic resin.

12. A fluid bearing device as claimed in claim 9, wherein said oil consists essentially of one of diester, polyol ester, alpha-olefin and mineral oil.

* * * * *